(12) United States Patent
Rhoden et al.

(10) Patent No.: US 10,703,500 B2
(45) Date of Patent: Jul. 7, 2020

(54) HEATED PIPE FOR LIQUID FLOWS

(71) Applicant: Hamilton Sundstrand Corporation, Charlotte, NC (US)

(72) Inventors: William E. Rhoden, Glastonbury, CT (US); Giacomo Mezzino, Turin (IT); Gianfranco Salvatoriello, Turin (IT)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/031,573

(22) Filed: Jul. 10, 2018

(65) Prior Publication Data

US 2020/0017231 A1 Jan. 16, 2020

(51) Int. Cl.

| *F16L 53/32* | (2018.01) |
| *B64D 37/32* | (2006.01) |
| *B64D 37/34* | (2006.01) |
| *F16L 55/24* | (2006.01) |
| *B33Y 80/00* | (2015.01) |
| *F16L 9/18* | (2006.01) |

(52) U.S. Cl.
CPC ............ *B64D 37/32* (2013.01); *B64D 37/34* (2013.01); *F16L 53/32* (2018.01); *F16L 55/24* (2013.01); *B33Y 80/00* (2014.12); *F16L 9/18* (2013.01)

(58) Field of Classification Search
CPC .. F16L 53/32; F16L 55/23; F16L 9/18; B64D 37/34
USPC .................................... 138/27, 32, 114, 148
See application file for complete search history.

(56) References Cited

U.S. PATENT DOCUMENTS

| 383,536 A | * | 5/1888 | Newman ................. F16L 53/32 138/32 |
| 745,060 A | * | 11/1903 | Hopkins .................... E03B 7/10 138/27 |
| 791,453 A | * | 6/1905 | Guddihy ............... B60T 17/006 138/34 |
| 1,112,154 A | * | 9/1914 | Mouat ..................... F16L 53/32 138/32 |
| 2,549,687 A | | 4/1951 | Jack et al. |
| 3,509,917 A | * | 5/1970 | Gartner .................. B25D 17/00 138/32 |
| 3,643,733 A | | 2/1972 | Hall et al. |
| 4,218,999 A | | 8/1980 | Shearer |
| 4,258,782 A | | 3/1981 | Kao |
| 4,365,404 A | * | 12/1982 | Castro ..................... F16L 53/32 29/455.1 |

(Continued)

FOREIGN PATENT DOCUMENTS

| CN | 104006259 B | 3/2016 |
| CN | 105571356 A | 5/2016 |

(Continued)

OTHER PUBLICATIONS

Extended European Search Report for European Patent Application No. 19185509.7, dated Nov. 29, 2019, 10 pages.

*Primary Examiner* — Patrick F Brinson
(74) *Attorney, Agent, or Firm* — Kinney & Lange, P.A.

(57) ABSTRACT

A pipe assembly includes a first wall having an inner surface defining a fuel flowpath, a second wall spaced radially outward of the first wall, a gap formed between the first wall and the second wall defining a flow passage, and a screen positioned within the fuel flowpath being shaped and configured to direct ice in the fuel flowpath toward the inner surface such that heat from the first wall melts the ice.

25 Claims, 10 Drawing Sheets

(56) References Cited

U.S. PATENT DOCUMENTS

| | | | |
|---|---|---|---|
| 4,381,819 A | 5/1983 | Paolino | |
| 4,915,121 A | 4/1990 | Rains | |
| 5,127,441 A | 7/1992 | Rains | |
| 5,588,635 A | 12/1996 | Hartman | |
| 7,756,404 B2 | 7/2010 | Schubert et al. | |
| 8,221,633 B2 * | 7/2012 | Lam | B01D 17/0217 210/788 |
| 9,016,351 B2 | 4/2015 | Guillaume et al. | |
| 10,422,448 B2 | 9/2019 | Carpignano | |
| 2013/0068704 A1 | 3/2013 | Hagshenas | |
| 2014/0305529 A1 | 10/2014 | Kroll et al. | |
| 2015/0041025 A1 | 2/2015 | Wescott et al. | |
| 2015/0291291 A1 | 10/2015 | Regan | |
| 2015/0362898 A1 | 12/2015 | Potter | |
| 2016/0003160 A1 | 1/2016 | Hagshenas | |
| 2016/0003380 A1 | 1/2016 | Ott et al. | |
| 2016/0160759 A1 * | 6/2016 | Reynes | F02C 7/047 138/32 |
| 2016/0238324 A1 | 8/2016 | Butcher et al. | |
| 2016/0298547 A1 | 10/2016 | Ripley et al. | |
| 2016/0312924 A1 | 10/2016 | Kolarski et al. | |
| 2017/0074446 A1 | 3/2017 | Sumner | |
| 2018/0080582 A1 | 3/2018 | Carpignano | |

FOREIGN PATENT DOCUMENTS

| | | |
|---|---|---|
| DE | 8800949 U1 | 3/1988 |
| DE | 9004539 U1 | 9/1990 |
| EP | 2902605 A1 | 8/2015 |
| EP | 2942489 A1 | 11/2015 |
| EP | 3290766 A1 | 3/2018 |
| GB | 1457087 A | 12/1976 |
| GB | 2440546 A | 2/2008 |
| JP | 2001201275 A | 7/2001 |
| RU | 2225807 C2 | 3/2004 |
| RU | 2514522 C2 | 4/2014 |

* cited by examiner

HEATED PIPE FOR LIQUID FLOWS

BACKGROUND

The present disclosure relates to deicing fuel flowing in a pipe. Ice particles can form in aircraft fuel tanks and front-end components of an engine fuel system. Such ice particles mix with fuel and travel downstream along with the fuel. Ice particles can damage downstream components. As a result, ice is usually melted via electrical heating elements located in the fuel lines. Use of electrical heating elements to melt ice particles flowing with the fuel can be inefficient.

SUMMARY

A pipe assembly includes a first wall having an inner surface defining a fuel flowpath, a second wall spaced radially outward of the first wall, a gap formed between the first wall and the second wall defining a flow passage, and a screen positioned within the fuel flowpath being shaped and configured to direct ice in the fuel flowpath toward the inner surface such that heat from the first wall melts the ice.

A heated pipe assembly includes a pipe extending from an upstream end to a downstream end and including an annular first wall creating a fuel flowpath, an annular second wall radially spaced from the first wall, an annular gap formed between the first wall and the second wall, a heating fluid inlet that receives a heating fluid, the heating fluid inlet extending through the second wall and into the annular gap, a heating fluid outlet that discharges the heating fluid, the heating fluid outlet extending from the annular gap and through the second wall, and a helical rib extending between the first wall and the second wall and defining a flow passage in the annular gap. The flow passage provides a heating flowpath configured to contain the heating fluid to heat the first wall. The heated pipe assembly further includes a screen connected to the first wall of the pipe and extending across the fuel flowpath. The screen is shaped to direct ice in the fuel flowpath to the first wall and trap the ice against the first wall such that heat from the first wall melts the ice.

A method of preventing ice from blocking a fuel flowpath includes urging ice flowing through the fuel flowpath radially outwardly toward an inner surface of a first wall that defines the fuel flowpath, flowing a fluid in a flow passage defined between the first wall and a second wall, increasing a temperature of the inner surface with the flowing of the fluid, and melting the ice.

DETAILED DESCRIPTION

In general, the present disclosure describes a heated screen in the fuel flowpath of a double-walled heated pipe. The screen blocks ice particles in the fuel flowpath and directs the ice particles to the first wall of the heated pipe, trapping the ice particles against the first wall until they melt and flow downstream as water. As a result, ice particles are prevented from clogging or damaging downstream components without requiring electrical heating.

Figure 1A:
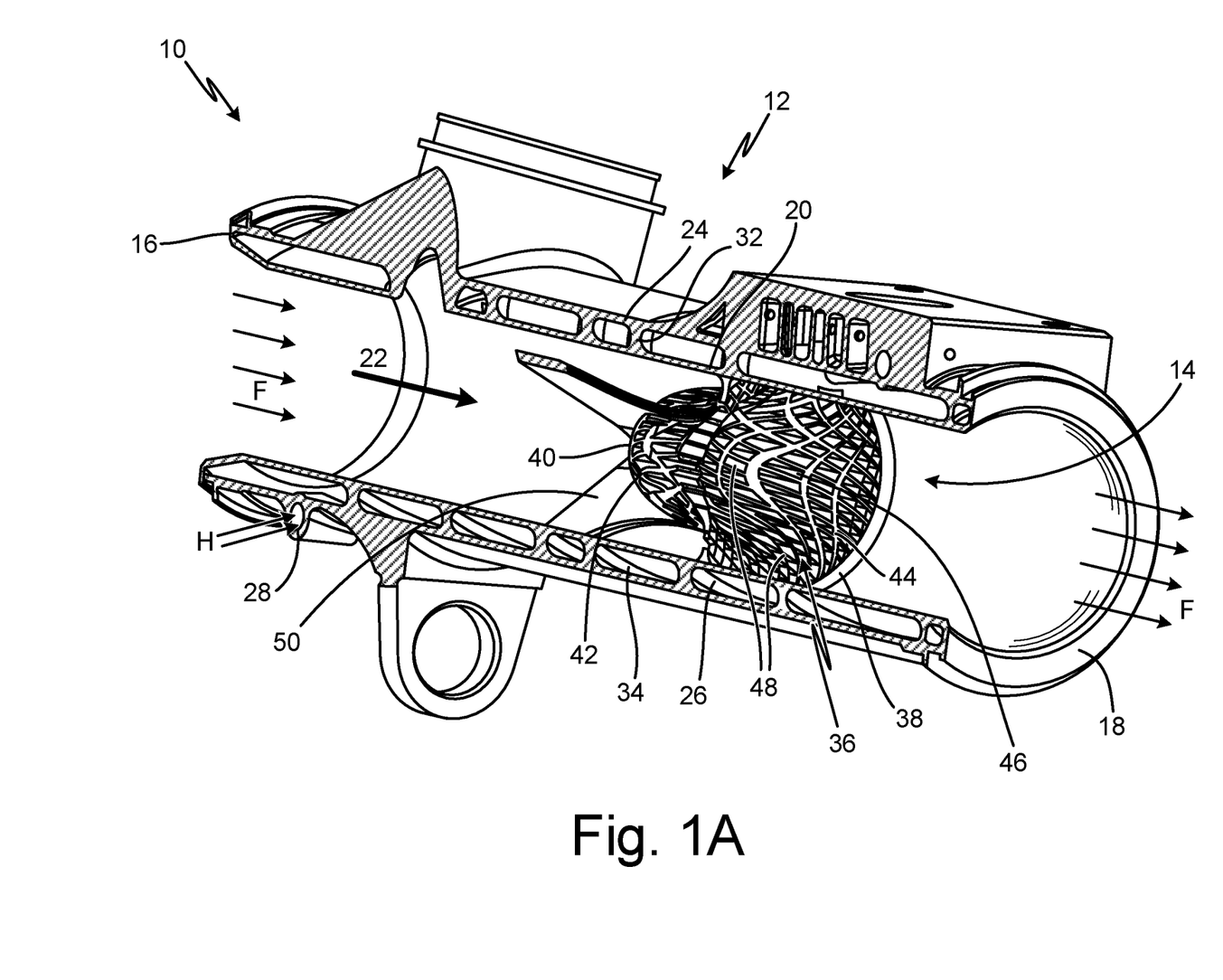
FIG. 1A is a cross-sectional perspective view of a heated pipe assembly showing a pipe and a screen having a conical shape.
Figure 1B:
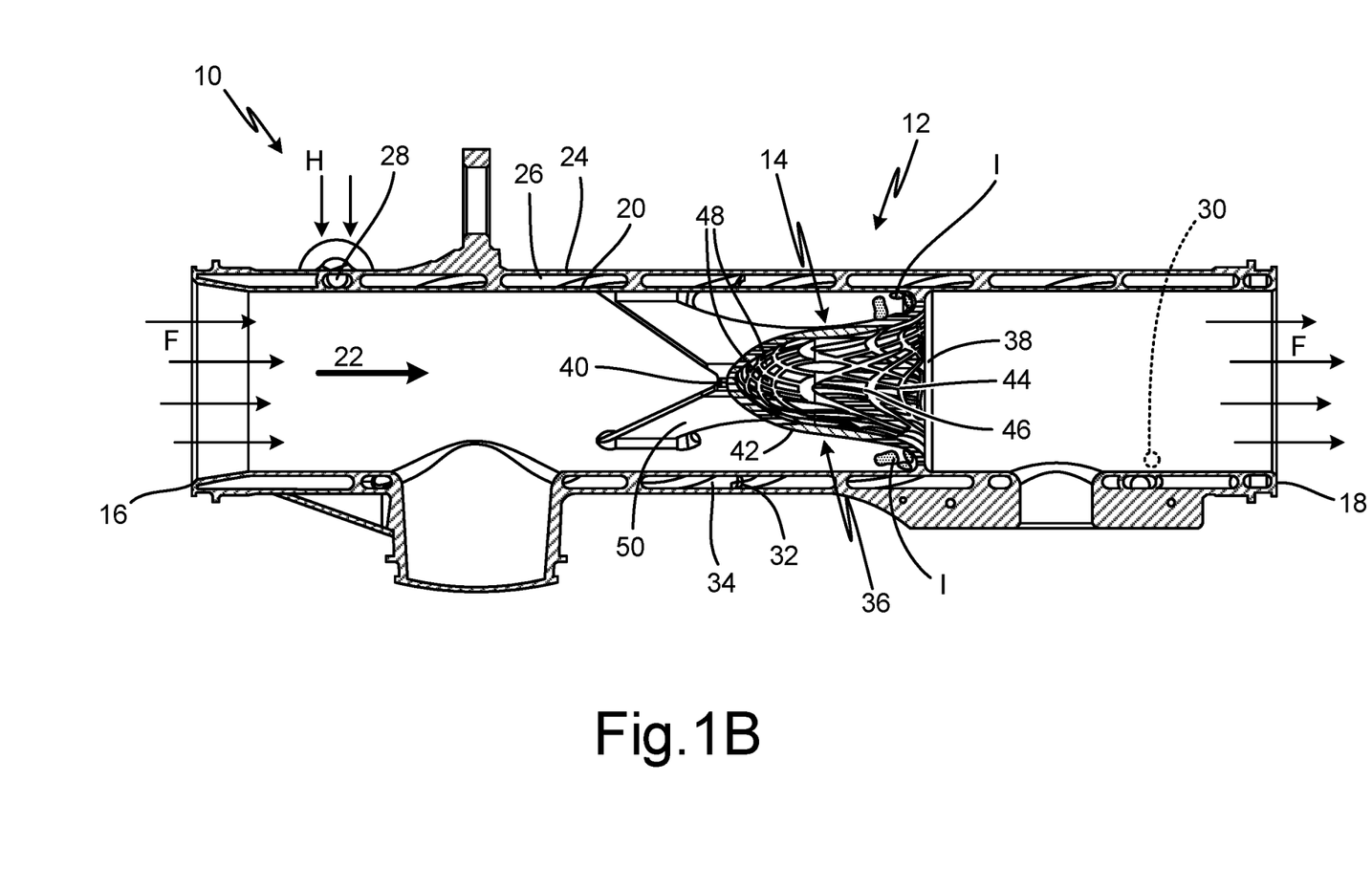
FIG. 1B is a cross-sectional view of the heated pipe assembly showing the pipe and the screen having a conical shape.
Figure 1C:
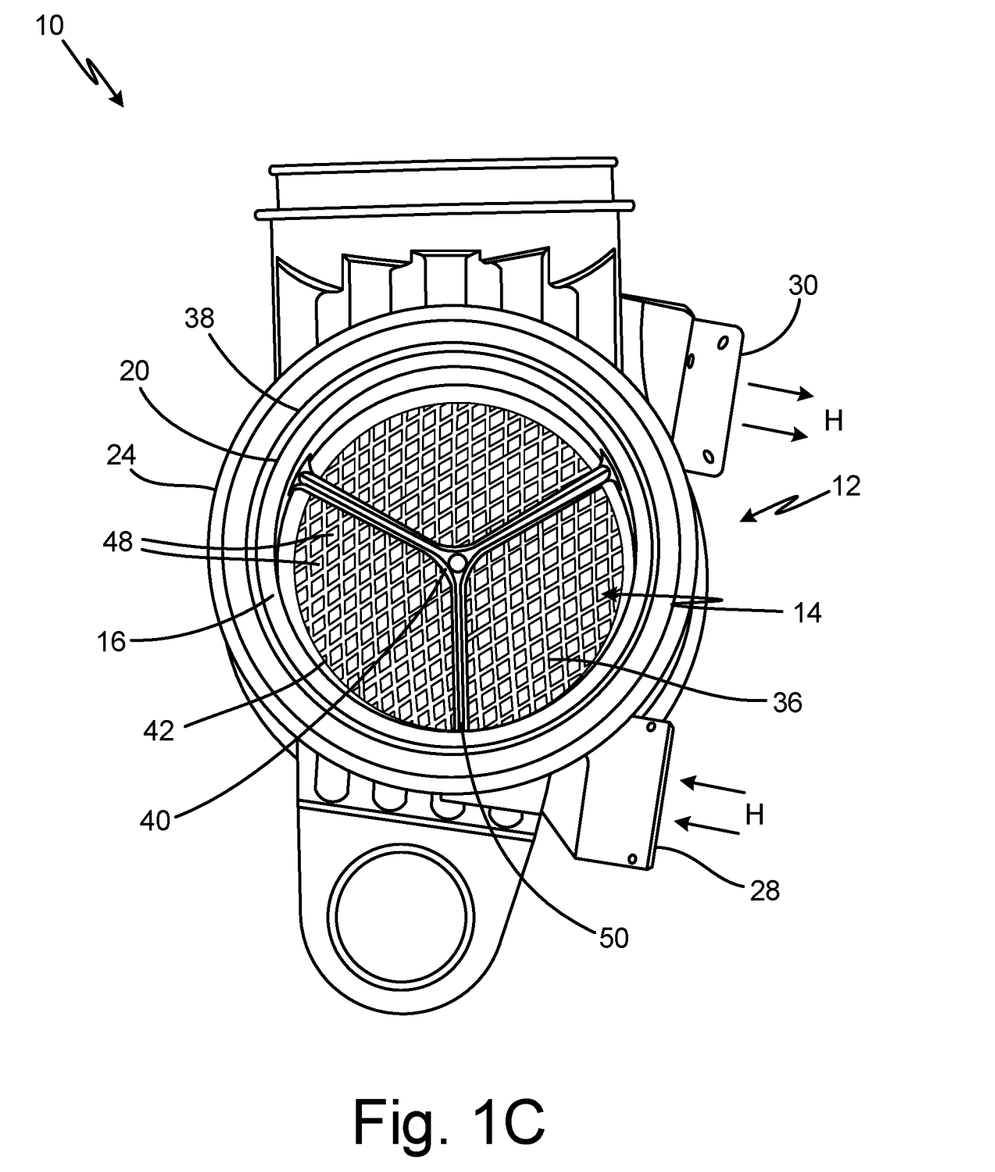
FIG. 1C is a cross-sectional end view of the heated pipe assembly showing the pipe and the screen having a conical shape.

FIG. 1A is a cross-sectional perspective view of heated pipe assembly 10 showing pipe 12 and screen 14 having a conical shape. FIG. 1B is a cross-sectional view of heated pipe assembly 10 showing pipe 12 and screen 14, which has a conical shape. FIG. 1C is a cross-sectional end view of heated pipe assembly 10 showing pipe 12 and conical shaped screen 14. FIGS. 1A, 1B, and 1C will be discussed together. Heated pipe assembly 10 includes pipe 12 and screen 14. Pipe 12 includes upstream end 16, downstream end 18, first wall 20, fuel flowpath 22, second wall 24, annular gap 26, heating fluid inlet 28, heating fluid outlet 30, rib 32, and flow passage 34. Screen 14 includes conical portion 36 (which includes downstream end 38, upstream end 40, upstream side 42, downstream side 44, and hollow portion 46) holes 48, and support structure 50.

Screen 14 is connected to pipe 12 and is made of the same material as pipe 12. As such, pipe 12 and screen 14 are metal, such as aluminum, stainless steel, Inconel, titanium, or any other suitable metal. In alternate embodiments, pipe 12 and screen 14 may be made of plastic. Pipe 12 extends from upstream end 16 to downstream end 18. Pipe 12 has annular first, or inner, wall 20 extending from upstream end 16 to downstream end 18. First wall 20 has an inner surface that creates, or defines, fuel flowpath 22. Fuel flowpath 22 provides a flowpath for fuel F within pipe 12. Annular second, or outer, wall 24 is spaced radially outward of first wall 20 such that first wall 20 is within second wall 24. As such, first wall 20 and second wall 24 are concentric. Annular gap 26 is an annular space formed between first wall 20 and second wall 24. Heating fluid inlet 28 extends through second wall 24 and into annular gap 26. Heating fluid inlet 28 is an opening that receives heating fluid H into heated pipe assembly 10. Heating fluid H is a hot fluid, such as oil or fuel from a downstream heat exchanger. Heating fluid outlet 30 extends from annular gap 26 through second wall 24. Heating fluid outlet 30 is an opening that discharges heating fluid H from heated pipe assembly 10. Rib 32 extends between first wall 20 and second wall 24. In this embodiment, rib 32 is helical. In alternate embodiments, rib 32 may be any suitable shape. Rib 32 may be one continuous rib or multiple spaced apart ribs. Annular gap 26 and rib 32 define flow passage 34 within annular gap 26. Flow passage 34 provides a heating flowpath in annular gap 26 to contain heating fluid H.

Screen 14 is connected to an inner surface of first wall 20 of pipe 12 and extends across fuel flowpath 22. As such, screen 14 is positioned within fuel flowpath 22. In this embodiment, screen 14 has a conical, or bell, shape. In alternate embodiments, screen 14 may have any suitable shape. Screen 14 has conical portion 36 with circular downstream end 38 having a periphery connected to first wall 20 and upstream end 40 extending upstream into fuel flowpath 22. Upstream end 40 is not connected to first wall 20. Conical portion 36 is shaped like a cone or bell. Upstream side 42 is the upstream surface of conical portion 36. Downstream side 44 is the downstream surface of conical portion 36. Downstream side 44 defines hollow portion 46 within conical portion 36. Hollow portion 46 extends upstream from downstream end 38 of conical portion 36. As such, conical portion 36 is hollow. Holes 48 extend from upstream side 42 to downstream side 44. In this embodiment, holes 48 are diamond shaped. In alternate embodiments, holes 48 may be circular, polygonal, or any other suitable shape. Support structure 50 is connected to conical portion 36. In this embodiment, support structure 50 includes three legs spaced evenly around conical portion 36. In alternate embodiments, support structure 50 may have two, four, or any other suitable number of legs to both maximize strength and minimize weight and cost of support structure 50. First ends of legs are connected to upstream side 42 near upstream end 40 of conical portion 36. Second ends of legs are connected to first wall 20. In alternate embodiments, screen 14 may not include support structure 50. Heated pipe assembly 10, including pipe 12 and screen 14, may be additively manufactured.

Heated pipe assembly 10 is positioned within a fuel system of an aircraft. For example, heated pipe assembly 10 may be located just downstream of a boost pump and upstream of a main fuel pump.

Fuel F moves axially through fuel flowpath 22 of pipe 12 from upstream end 16 to downstream end 18. Fuel F is cold at upstream end 16. Heating fluid H enters pipe 12 at heating fluid inlet 28 and moves, or flows, through flow passage 34 in annular gap 26 to exit pipe 12 at heating fluid outlet 30. Heating fluid H is warm at heating fluid inlet 28. Helical rib 32 causes heating fluid H to flow around first wall 20 in a helical pattern. As such, flow passage 34 provides a heating flowpath to heat first wall 20 and screen 14. Heating fluid H contacts an outer surface of first wall 20, transferring heat to first wall 20 and increasing the temperature of the inner surface of first wall 20. Consequently, heating fluid H loses heat as heating fluid H moves through flow passage 34. An inner surface of heated first wall 20 contacts screen 14, transferring heat to screen 14. Heated first wall 20 also contacts and transfers heat to fuel F as fuel F moves through fuel flowpath 22. As such, fuel F is warmer at downstream end 18 as fuel F exits pipe 12.

Ice particles I may form in aircraft fuel tanks or front-end components of an engine fuel system. Such ice particles I may travel downstream through fuel flowpath 22 along with fuel F. As a result, fuel F may contain ice particles I at upstream end 16. As fuel F moves through fuel flowpath 22, screen 14 blocks ice particles I. Ice particles I contact screen 14 and begin to melt. Ice particles I not fully melted by heated screen 14 move downstream along screen 14. Screen 14 is shaped to direct, or urge, ice particles I in fuel flowpath 22 radially outwardly toward an inner diameter, or inner surface, of first wall 20 and trap ice particles I against the inner surface of first wall 20. As such, ice particles I at upstream side 42 of a periphery of circular downstream end 38 of screen 14 are adjacent first wall 20, and heat from first wall 20 melts ice particles I. Heated screen 14 may also provide heat to melt ice particles I. As such, heated pipe assembly 10 acts as a heat exchanger between heating fluid H and fuel F with ice particles I.

Holes 48 allow fuel F to bypass screen 14. Ice particles I smaller than holes 48 are also able to bypass screen 14. Ice particles I larger than holes 48 are prevented from moving past screen 14 to downstream end 18. Thus, holes 48 are sized and shaped based on the size of ice particles I that screen 14 is intended to block while also maintaining an appropriate pressure drop. Screen 14 is fine enough that screen 14 can capture the desired amount of ice particles I while being coarse enough not to cause a pressure drop across screen 14 high enough that fuel F stops flowing through fuel flowpath 22. Ice particles I are trapped against heated first wall 20 by heated screen 14 until ice particles I melt. Melted ice particles pass through screen 14 as water.

Ice particles may damage downstream components or become problematic within downstream components, such as the fuel metering unit. As a result, ice is usually melted via electrical heating elements located in the fuel lines. For example, fuel heaters may be attached to the pipe, having a heater element positioned around the outside of the pipe to electrically heat the fuel. Electrical heating requires power. Additionally, ice particles can move through a heated pipe assembly without melting by the time the fuel exits the heated pipe assembly.

Heated pipe assembly 10 provides an effective in-line method of deicing fuel without requiring electrical heating. Screen 14 also prevents large ice particles from exiting the heated pipe assembly along with fuel F. Screen 14 keeps ice particles I within heated pipe assembly 10 for a longer amount of time and directs ice particles I to an optimal heat source, heated first wall 20, to cause ice particles I to melt. Therefore, not only are ice particles I caught and trapped by screen 14 until ice particles I melt, heat is more greatly distributed to ice particles I such that ice particles I melt more quickly. As a result, ice particles I do not accumulate or cause blockage within heated pipe assembly 10. Ice particles I stay within fuel flowpath 22 long enough to melt before proceeding as water to the next part of the fuel system. Thus, heated pipe assembly 10 efficiently melts ice particles I, preventing ice particles I from moving downstream and clogging or damaging other components, without resorting to electrical means.

Figure 2:
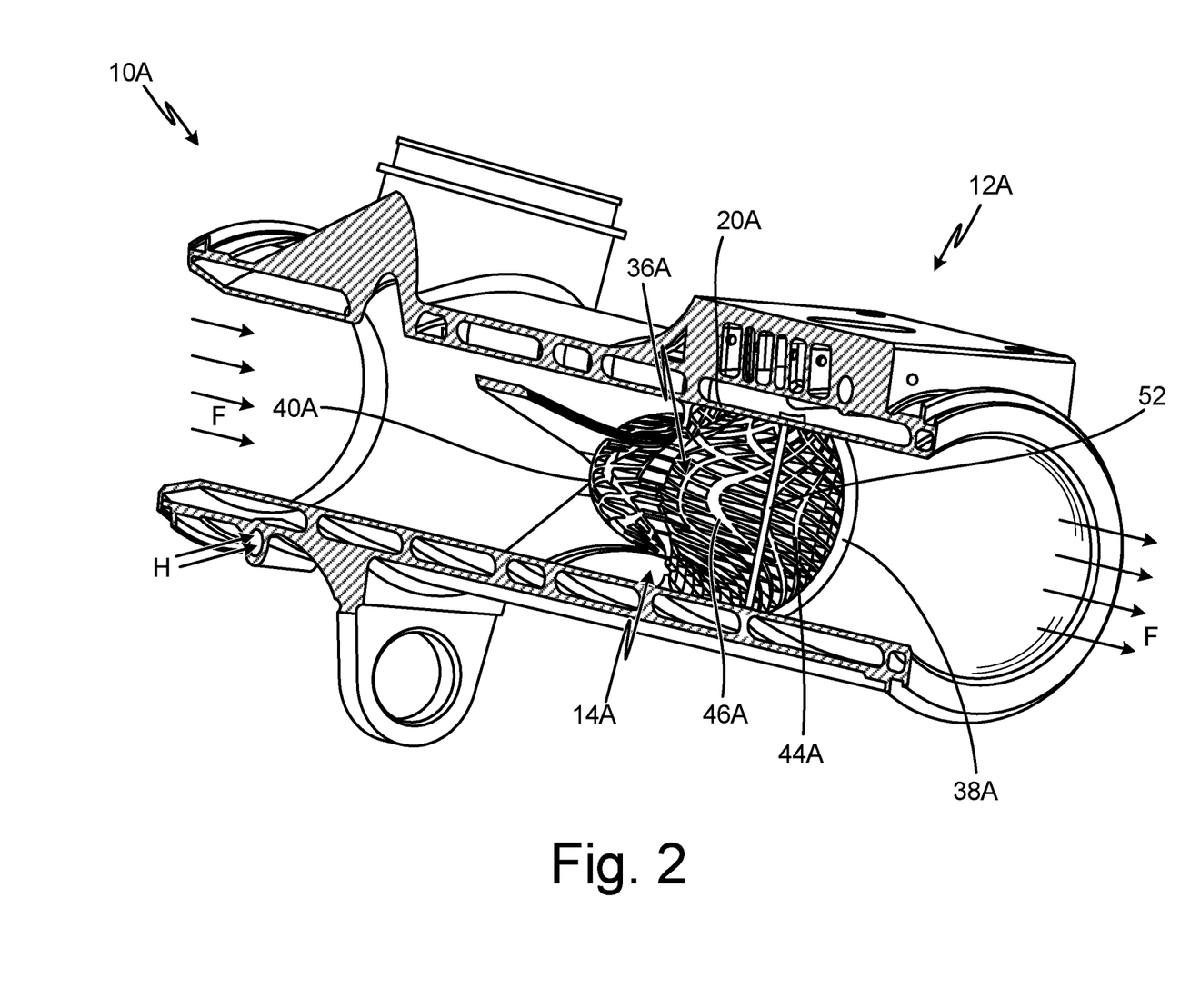
FIG. 2 is a cross-sectional perspective view of the heated pipe assembly showing the pipe and a screen with a crossbar.

FIG. 2 is a cross-sectional perspective view of heated pipe assembly 10A showing pipe 12A and screen 14A with crossbar 52. Heated pipe assembly 10A includes pipe 12A and screen 14A. Pipe 12A includes first wall 20A. Screen 14A includes conical portion 36A (which includes downstream end 38A, upstream end 40A, and downstream side 44A, and hollow portion 46A) and crossbar 52.

Pipe 12A has the same structure and function as described in reference to pipe 12 in FIGS. 1A, 1B, and 1C. Screen 14A has the same structure and function as described in reference to screen 14 in FIGS. 1A, 1B, and 1C except that screen 14A also includes crossbar 52. Crossbar 52 is a rod or bar that extends across hollow portion 46A within conical portion 36A. As such, ends of crossbar 52 are attached to downstream side 44A of conical portion 36A. In this embodiment, crossbar 52 is near downstream end 38A of conical portion 36. In alternate embodiments, crossbar 52 may be near upstream end 40A or in any other suitable location within hollow portion 46A.

Heat from first wall 20A is transferred to crossbar 52. Crossbar 52 facilitates heat transfer from first wall 20 through conical portion 36A. As a result, conical portion 36A is more easily heated and ice particles I that contact heated screen 14A more easily melt.

Figure 3A:
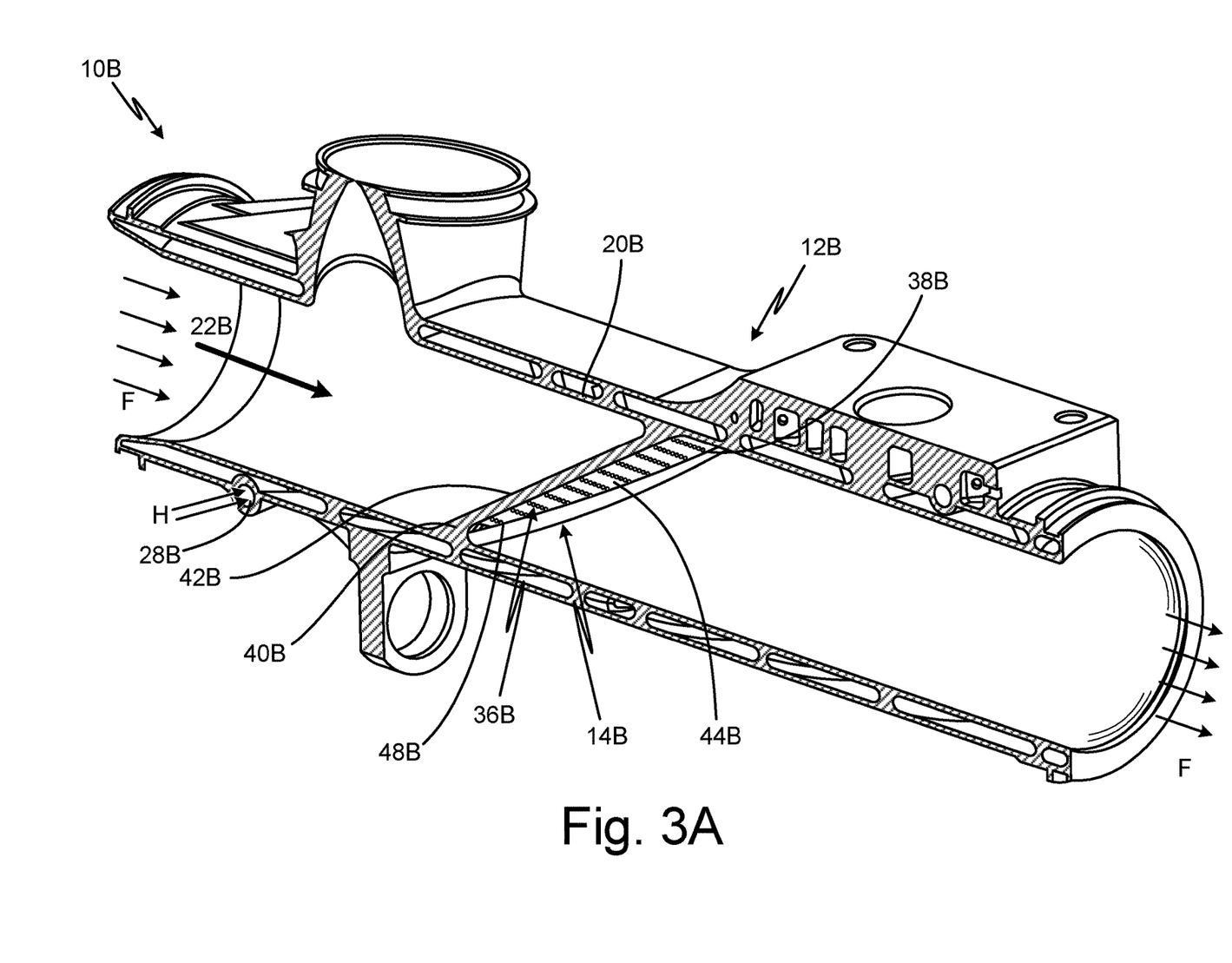
FIG. 3A is a cross-sectional perspective view of the heated pipe assembly showing the pipe and an angled flat screen.
Figure 3B:
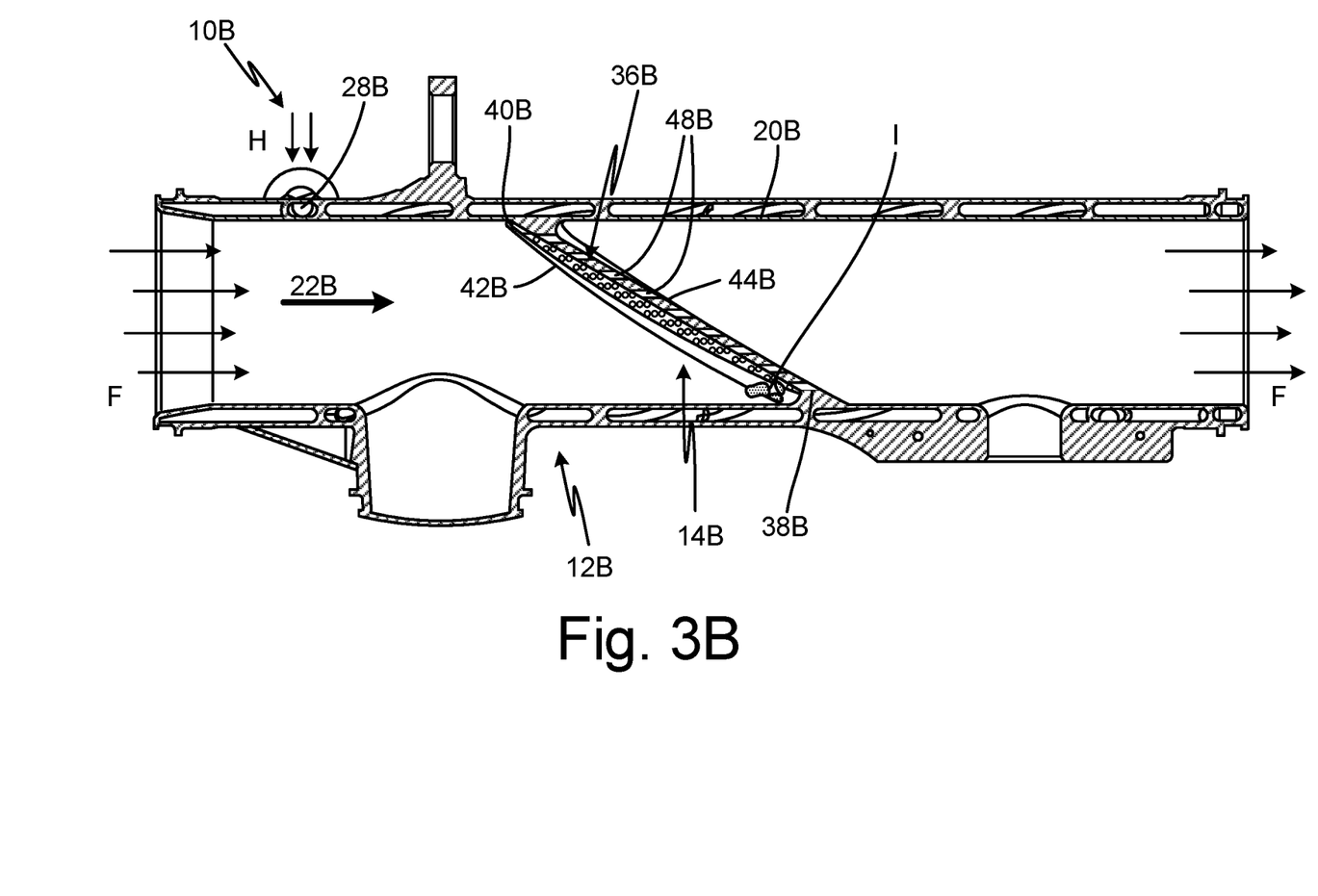
FIG. 3B is a cross-sectional view of the heated pipe assembly showing the pipe and the angled flat screen.
Figure 3C:
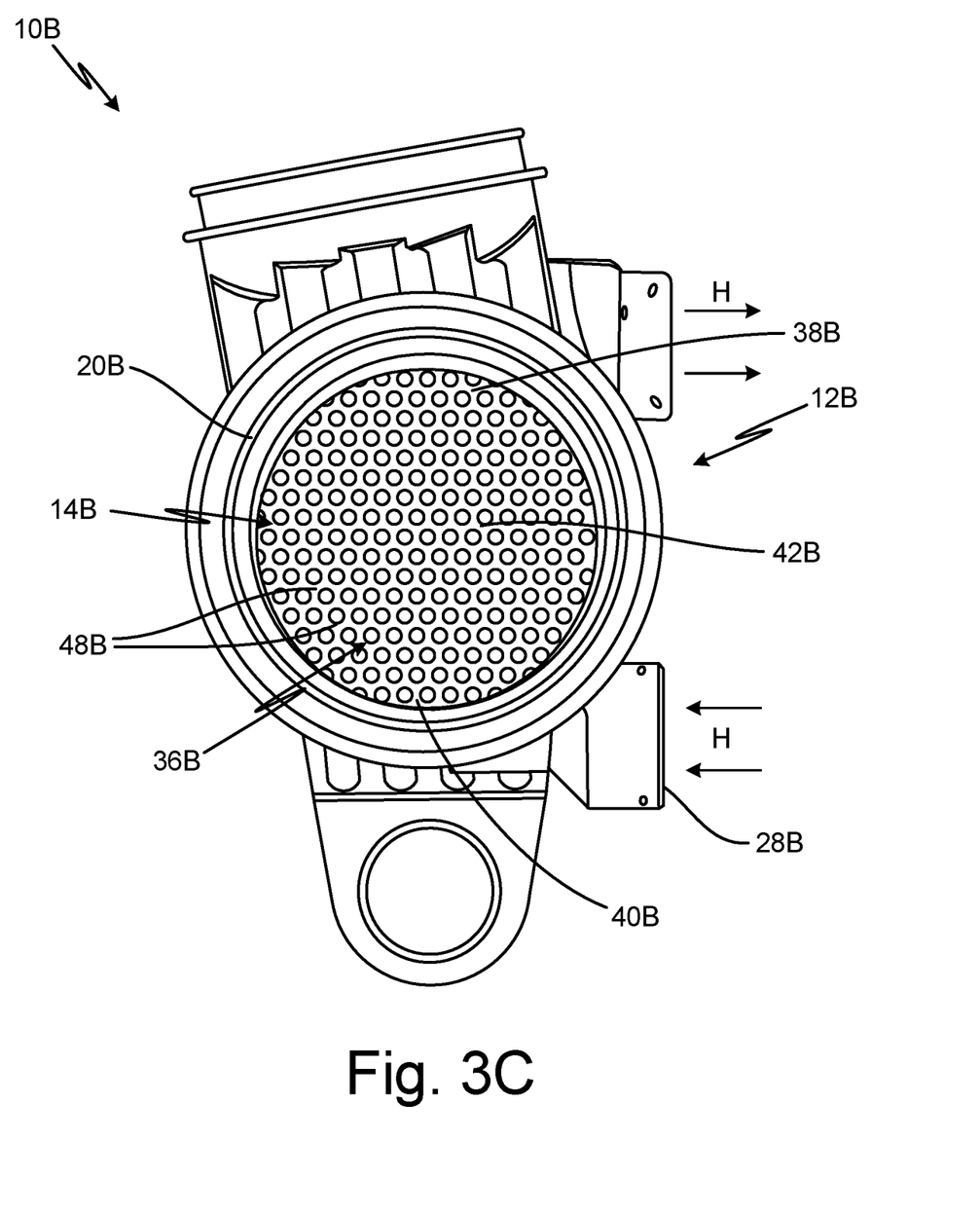
FIG. 3C is a cross-sectional end view of the heated pipe assembly showing the pipe and the angled flat screen.

FIG. 3A is a cross-sectional perspective view of heated pipe assembly 10B showing pipe 12B and angled flat screen 14B. FIG. 3B is a cross-sectional view of heated pipe assembly 10B showing pipe 12B and angled flat screen 14B. FIG. 3C is a cross-sectional end view of heated pipe assembly 10B showing pipe 12B and angled flat screen 14B. FIGS. 3A, 3B, and 3C will be discussed together. Heated pipe assembly 10B includes pipe 12B and screen 14B. Pipe 12B includes first wall 20B, fuel flowpath 22B, and heating fluid inlet 28B. Screen 14B includes flat portion 36B (which includes downstream end 38B, upstream end 40B, upstream side 42B, and downstream side 44B) and holes 48B.

Pipe 12B has the same structure and function as described in reference to pipe 12 in FIGS. 1A, 1B, and 1C. Screen 14B has the same structure and function as described in reference to screen 14 in FIGS. 1A, 1B, and 1C except that screen 14B has a flat oval shape with flat portion 36B instead of a conical shape with conical portion 36, and screen 14B does not include support structure 50. In this embodiment, screen 14B has flat portion 36B having an oval shape with a periphery connected to first wall 20B. Flat portion 36B has downstream end 38B connected to first wall 20B of pipe 12B near heating fluid inlet 28B and upstream end 40B connected to first wall 20B of pipe 12B upstream of downstream end 38B. As such, screen 14B is substantially flat and extends across fuel flowpath 22B at an angle. Upstream side 42B is the upstream surface of flat portion 36B, and downstream side 44B is the downstream surface of flat portion 36B. Holes 48B extend from upstream side 42B to downstream side 44B. In this embodiment, holes 48A are circular.

Ice particles I blocked by angled flat screen 14B move downstream along screen 14B to a side of pipe 12B connected to a periphery of downstream end 38B. As such, ice particles I are directed to and trapped against a portion of an inner diameter of first wall 20B of pipe 12B near heating fluid inlet 28B. Because heating fluid H is hottest at heating fluid inlet 28B and screen 14B directs ice particles I to a portion of first wall 20B near heating fluid inlet 28B, ice particles I are directed to a portion of first wall 20B that maximizes thermal exchange. As a result, ice particles I trapped by screen 14B melt and exit heated pipe assembly 10B as water more quickly.

Figure 4A:
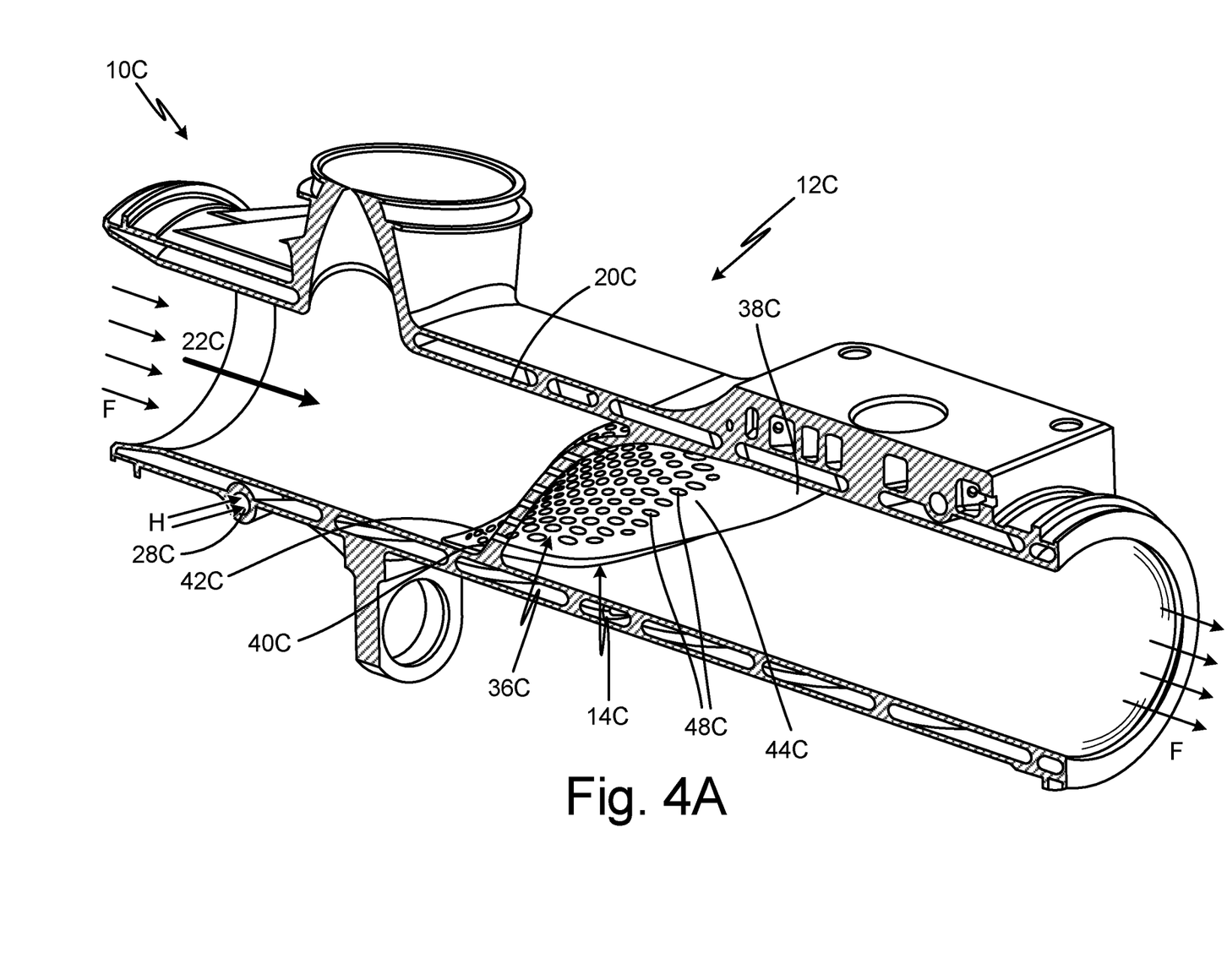
FIG. 4A is a cross-sectional perspective view of the heated pipe assembly showing the pipe and a screen having a wave shape.
Figure 4B:
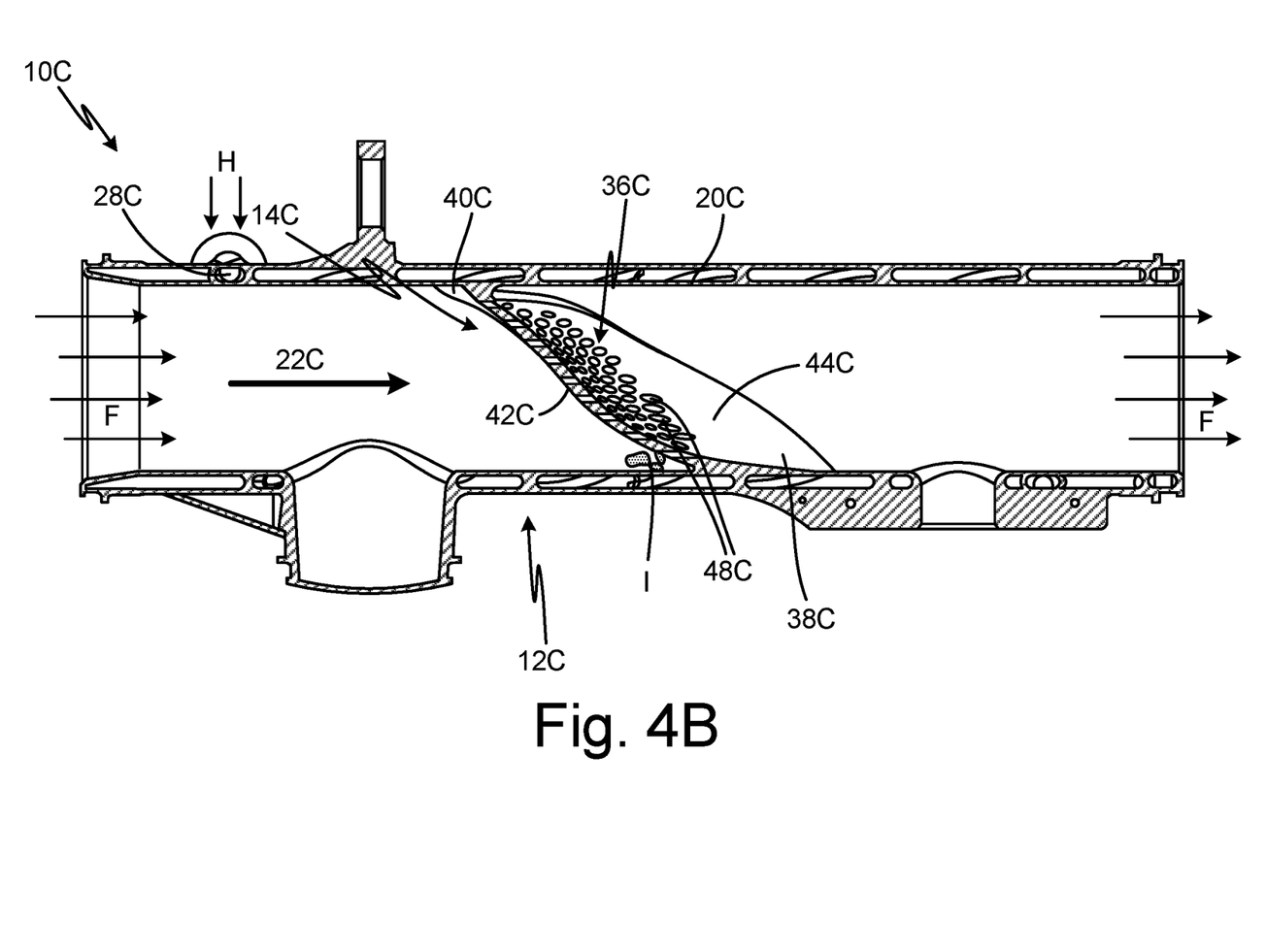
FIG. 4B is a cross-sectional view of the heated pipe assembly showing the pipe and the screen having a wave shape.
Figure 4C:
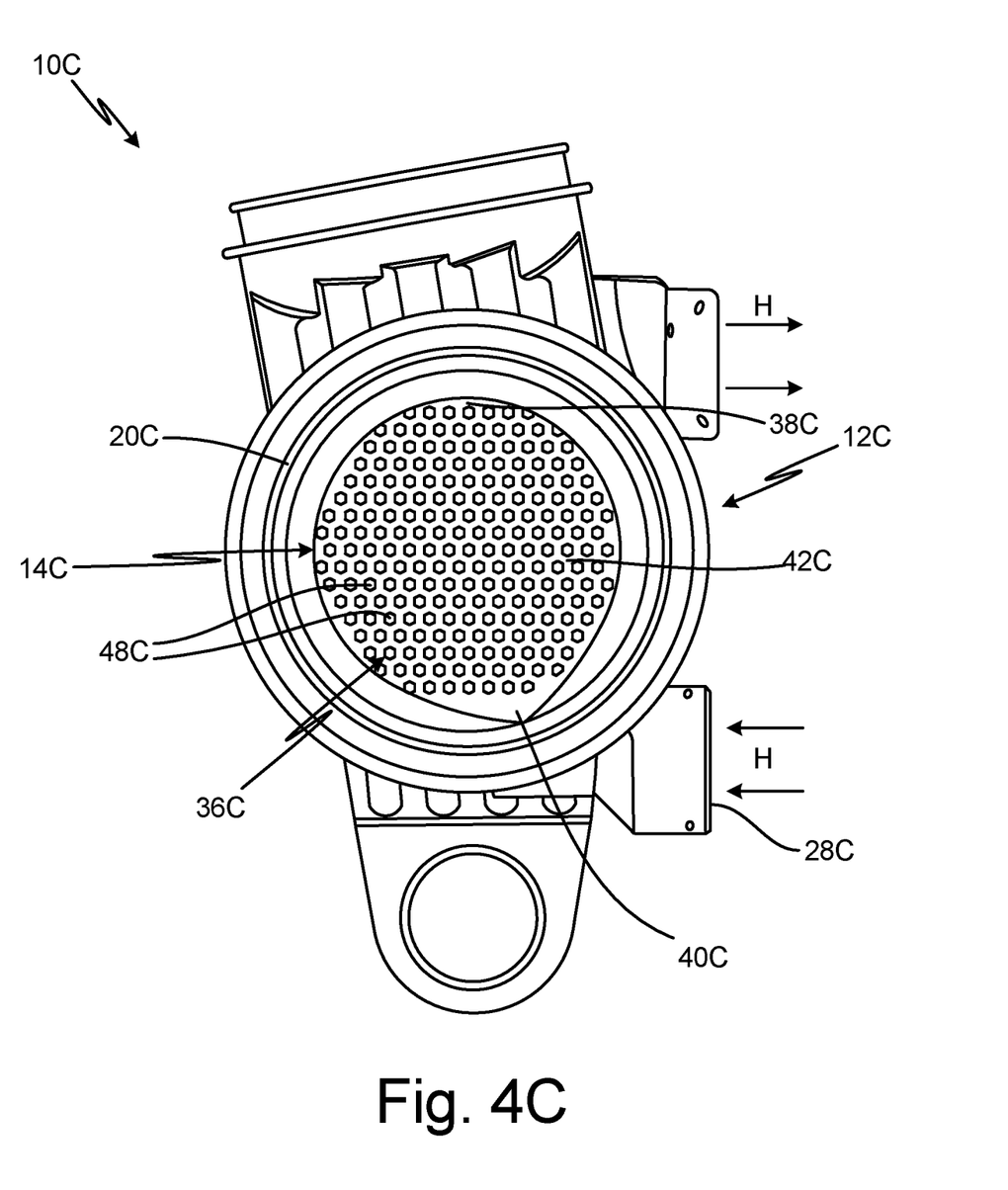
FIG. 4C is a cross-sectional end view of the heated pipe assembly showing the pipe and the screen having a wave shape.

FIG. 4A is a cross-sectional perspective view of heated pipe assembly 10C showing pipe 12C and screen 14C having a wave shape. FIG. 4B is a cross-sectional view of heated pipe assembly 10C showing pipe 12C and screen 14C, which has a wave shape. FIG. 4C is a cross-sectional end view of heated pipe assembly 10C showing pipe 12C and wave shaped screen 14C. FIGS. 4A, 4B, and 4C will be discussed together. Heated pipe assembly 10C includes pipe 12C and screen 14C. Pipe 12C includes first wall 20C, fuel flowpath 22C, and heating fluid inlet 28C. Screen 14C includes wave shaped portion 36C (which includes downstream end 38C, upstream end 40C, upstream side 42C, and downstream side 44C) and holes 48C.

Pipe 12C has the same structure and function as described in reference to pipe 12 in FIGS. 1A, 1B, and 1C. Screen 14C has the same structure and function as described in reference to screen 14 in FIGS. 1A, 1B, and 1C except that screen 14C has a wave shape with wave shaped portion 36C instead of a conical shape with conical portion 36, and screen 14C does not include support structure 50. In this embodiment, screen 14C has wave shaped portion 36C having a wave shape with a periphery connected to first wall 20C. Wave shaped portion 36C has downstream end 38C connected to first wall 20C of pipe 12C near heating fluid inlet 28C and upstream end 40C connected to first wall 20C of pipe 12C upstream of downstream end 38C. Downstream end 38C meets first wall 20C at an angle, and upstream end 40C meets first wall 20C at an angle. As such, screen 14C is wave shaped and extends across fuel flowpath 22B such that screen 14C is most perpendicular to first wall 20C near a center portion of screen 14C. Upstream side 42C is the upstream surface of wave shaped portion 36C, and downstream side 44C is the downstream surface of wave shaped portion 36C. Holes 48C extend from upstream side 42C to downstream side 44C. In this embodiment, holes 48C are polygonal (specifically, hexagonal).

Ice particles I blocked by wave shaped screen 14C move downstream along screen 14C to a side of pipe 12C connected to a periphery of downstream end 38C. As such, ice particles I are directed to and trapped against a precise portion of an inner diameter of first wall 20C of pipe 12C near heating fluid inlet 28C. Because heating fluid H is hottest at heating fluid inlet 28C and screen 14C directs ice particles I to a precise portion of first wall 20C near heating fluid inlet 28C, ice particles I are directed to a portion of first wall 20C that maximizes thermal exchange. As a result, ice particles I trapped by screen 14C melt and exit heated pipe assembly 10C as water more quickly.

Discussion of Possible Embodiments

The following are non-exclusive descriptions of possible embodiments of the present invention.

A pipe assembly includes a first wall having an inner surface defining a fuel flowpath; a second wall spaced radially outward of the first wall; a gap formed between the first wall and the second wall defining a flow passage; and a screen positioned within the fuel flowpath being shaped and configured to direct ice in the fuel flowpath toward the inner surface such that heat from the first wall melts the ice.

The pipe assembly of the preceding paragraph can optionally include, additionally and/or alternatively, any one or more of the following features, configurations and/or additional components:

The flow passage is further defined by a rib extending between the first wall and the second wall.

The rib is helical.

The flow passage provides a heating flowpath configured to contain a heating fluid to heat the first wall and the screen.

A heating fluid inlet that receives the heating fluid, the heating fluid inlet extending through the second wall and into the annular gap; and a heating fluid outlet that discharges the heating fluid, the heating fluid outlet extending from the annular gap and through the second wall.

The pipe assembly is an additively manufactured structure.

The screen is shaped to trap the ice in the fuel flowpath against the first wall.

The screen has a conical portion with a downstream end connected to the first wall and an upstream end extending upstream into the fuel flowpath.

The screen includes a support structure connected to the upstream end of the conical portion and the first wall.

The screen includes a crossbar extending across a hollow portion within the conical portion.

The screen is substantially flat and has a downstream end connected to the first wall and an upstream end connected to the first wall.

The screen has a wave shape with a downstream end connected to the first wall and an upstream end connected to the first wall.

The screen has holes extending from an upstream side of the screen to a downstream side of the screen.

The holes have a shape selected from a group consisting of a diamond shape, a circular shape, and a polygonal shape.

A heated pipe assembly includes a pipe extending from an upstream end to a downstream end; the pipe including: an annular first wall creating a fuel flowpath; an annular second wall radially spaced from the first wall; an annular gap formed between the first wall and the second wall; a heating fluid inlet that receives a heating fluid, the heating fluid inlet extending through the second wall and into the annular gap; a heating fluid outlet that discharges the heating fluid, the heating fluid outlet extending from the annular gap and through the second wall; and a helical rib extending between the first wall and the second wall and defining a flow passage in the annular gap, wherein the flow passage provides a heating flowpath configured to contain the heating fluid to heat the first wall; and a screen connected to the first wall of the pipe and extending across the fuel flowpath, wherein the screen is shaped to direct ice in the fuel flowpath to the first wall and trap the ice against the first wall such that heat from the first wall melts the ice.

The heated pipe assembly of the preceding paragraph can optionally include, additionally and/or alternatively, any one or more of the following features, configurations and/or additional components:

The screen includes: a conical portion with a downstream end connected to the first wall and an upstream end extending upstream into the fuel flowpath; a support structure connected to the upstream end of the conical portion and the first wall; and a crossbar extending across a hollow portion within the conical portion.

The screen is substantially flat and has a downstream end connected to the first wall and an upstream end connected to the first wall.

The screen has a wave shape with a downstream end connected to the first wall and an upstream end connected to the first wall.

The screen has holes extending from an upstream side of the screen to a downstream side of the screen, the holes having a shape selected from a group consisting of a diamond shape, a circular shape, and a polygonal shape.

A method of preventing ice from blocking a fuel flowpath includes urging ice flowing through the fuel flowpath radially outwardly toward an inner surface of a first wall that defines the fuel flowpath; flowing a fluid in a flow passage defined between the first wall and a second wall; increasing a temperature of the inner surface with the flowing of the fluid; and melting the ice.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pipe assembly comprising:
   a first wall having an inner surface defining a fuel flowpath;
   a second wall spaced radially outward of the first wall;
   a gap formed between the first wall and the second wall defining a flow passage; and
   a screen positioned within the fuel flowpath being shaped and configured to direct ice in the fuel flowpath toward the inner surface such that heat from the first wall melts the ice, wherein the screen has holes extending from an upstream side of the screen to a downstream side of the screen.

2. The pipe assembly of claim 1, wherein the flow passage is further defined by a rib extending between the first wall and the second wall.

3. The pipe assembly of claim 2, wherein the rib is helical.

4. The pipe assembly of claim 1, wherein the flow passage provides a heating flowpath configured to contain a heating fluid to heat the first wall and the screen.

5. The pipe assembly of claim 4, and further including a heating fluid inlet that receives the heating fluid, the heating fluid inlet extending through the second wall and into the annular gap;
   and a heating fluid outlet that discharges the heating fluid, the heating fluid outlet extending from the annular gap and through the second wall.

6. The pipe assembly of claim 1, wherein the pipe assembly is an additively manufactured structure.

7. The pipe assembly of claim 1, wherein the screen is shaped to trap the ice in the fuel flowpath against the first wall.

8. The pipe assembly of claim 1, wherein the screen has a conical portion with a downstream end connected to the first wall and an upstream end extending upstream into the fuel flowpath.

9. The pipe assembly of claim 8, wherein the screen includes a support structure connected to the upstream end of the conical portion and the first wall.

10. The pipe assembly of claim 8, wherein the screen includes a crossbar extending across a hollow portion within the conical portion.

11. The pipe assembly of claim 1, wherein the screen is substantially flat and has a downstream end connected to the first wall and an upstream end connected to the first wall.

12. The pipe assembly of claim 1, wherein the screen has a wave shape with a downstream end connected to the first wall and an upstream end connected to the first wall.

13. The pipe assembly of claim 1, wherein the holes have a shape selected from a group consisting of a diamond shape, a circular shape, and a polygonal shape.

14. A heated pipe assembly comprising:
   a pipe extending from an upstream end to a downstream end; the pipe including:
      an annular first wall creating a fuel flowpath;
      an annular second wall radially spaced from the first wall;
      an annular gap formed between the first wall and the second wall;
      a heating fluid inlet that receives a heating fluid, the heating fluid inlet extending through the second wall and into the annular gap;
      a heating fluid outlet that discharges the heating fluid, the heating fluid outlet extending from the annular gap and through the second wall; and
      a helical rib extending between the first wall and the second wall and defining a flow passage in the annular gap, wherein the flow passage provides a heating flowpath configured to contain the heating fluid to heat the first wall; and a screen connected to the first wall of the pipe and extending across the fuel flowpath, wherein the screen is shaped to direct ice in the fuel flowpath to the first wall and trap the ice against the first wall such that heat from the first wall melts the ice.

15. The heated pipe assembly of claim 14, the screen includes:
   a conical portion with a downstream end connected to the first wall and an upstream end extending upstream into the fuel flowpath;
   a support structure connected to the upstream end of the conical portion and the first wall; and
   a crossbar extending across a hollow portion within the conical portion.

16. The heated pipe assembly of claim 14, wherein the screen is substantially flat and has a downstream end connected to the first wall and an upstream end connected to the first wall.

17. The heated pipe assembly of claim 14, wherein the screen has a wave shape with a downstream end connected to the first wall and an upstream end connected to the first wall.

18. The heated pipe assembly of claim 14, wherein the screen has holes extending from an upstream side of the screen to a downstream side of the screen, the holes having a shape selected from a group consisting of a diamond shape, a circular shape, and a polygonal shape.

19. A method of preventing ice from blocking a fuel flowpath comprising:
   urging ice flowing through the fuel flowpath radially outwardly toward an inner surface of a first wall that defines the fuel flowpath using a screen positioned within the fuel flowpath;
   flowing a fluid in a flow passage defined between the first wall and a second wall;
   increasing a temperature of the inner surface with the flowing of the fluid; and
   melting the ice.

20. A pipe assembly comprising:
   a first wall having an inner surface defining a fuel flowpath;
   a second wall spaced radially outward of the first wall;
   a gap formed between the first wall and the second wall defining a flow passage; and
   a screen positioned within the fuel flowpath being shaped and configured to direct ice in the fuel flowpath toward the inner surface such that heat from the first wall melts the ice, wherein the screen is shaped to trap the ice in the fuel flowpath against the first wall.

21. A pipe assembly comprising:
   a first wall having an inner surface defining a fuel flowpath;
   a second wall spaced radially outward of the first wall;
   a gap formed between the first wall and the second wall defining a flow passage; and
   a screen positioned within the fuel flowpath being shaped and configured to direct ice in the fuel flowpath toward the inner surface such that heat from the first wall melts the ice, wherein the screen has a conical portion with a downstream end connected to the first wall and an upstream end extending upstream into the fuel flowpath.

22. The pipe assembly of claim 21, wherein the screen includes a support structure connected to the upstream end of the conical portion and the first wall.

23. The pipe assembly of claim 21, wherein the screen includes a crossbar extending across a hollow portion within the conical portion.

24. A pipe assembly comprising:
   a first wall having an inner surface defining a fuel flowpath;
   a second wall spaced radially outward of the first wall;
   a gap formed between the first wall and the second wall defining a flow passage; and
   a screen positioned within the fuel flowpath being shaped and configured to direct ice in the fuel flowpath toward the inner surface such that heat from the first wall melts the ice, wherein the screen is substantially flat and has a downstream end connected to the first wall and an upstream end connected to the first wall.

25. A pipe assembly comprising:
   a first wall having an inner surface defining a fuel flowpath;
   a second wall spaced radially outward of the first wall;
   a gap formed between the first wall and the second wall defining a flow passage; and
   a screen positioned within the fuel flowpath being shaped and configured to direct ice in the fuel flowpath toward the inner surface such that heat from the first wall melts the ice, wherein the screen has a wave shape with a downstream end connected to the first wall and an upstream end connected to the first wall.

* * * * *